| United States Patent [19]
Alberti et al. | [11] 3,985,611
[45] Oct. 12, 1976 |

[54] WHOLLY INOGANIC PAPERS AND MEMBRANES SUITABLE FOR ION EXCHANGE MADE OF THORIUM ACID PHOSPHATE AND PROCESS FOR PREPARING THE SAME

[75] Inventors: Giulio Alberti; Umberto Costantino, both of Rome, Italy

[73] Assignee: Comitate Nazionale per l'Energia Nucleare, Rome, Italy

[22] Filed: July 15, 1971

[21] Appl. No.: 163,091

[52] U.S. Cl. .............................. 162/157 R; 162/146; 210/502
[51] Int. Cl.² .......................................... D21H 5/12
[58] Field of Search ............ 162/181 A, 157 R, 146; 210/24, 31 R, 31 C, 501, 502, 489

[56] References Cited
UNITED STATES PATENTS

| | | | |
|---|---|---|---|
| 2,952,580 | 9/1960 | Frasch ............................ | 162/181 A |
| 3,328,117 | 6/1967 | Emslie et al. .................. | 162/181 R |
| 3,337,451 | 8/1967 | Calmon ............................. | 210/24 |
| 3,382,034 | 5/1968 | Kraus ................................ | 210/24 |
| 3,551,287 | 12/1970 | Alberti et al. ................... | 162/157 R |

*Primary Examiner*—Robert L. Lindsay, Jr.
*Assistant Examiner*—Kenneth M. Schor
*Attorney, Agent, or Firm*—Richards & Geier

[57] ABSTRACT

Inorganic layers, papers and membranes for ion exchange are made of fibrous thorium acid phosphate with a ratio $PO_4/Th$ in the solid of about 2.

2 Claims, No Drawings

WHOLLY INOGANIC PAPERS AND MEMBRANES SUITABLE FOR ION EXCHANGE MADE OF THORIUM ACID PHOSPHATE AND PROCESS FOR PREPARING THE SAME

This invention relates to a process for preparing papers and membranes suitable for ion exchange which are totally inorganic and are made of thorium phosphate.

Papers and membranes for ion exchange comprising an organic matrix have been available on the trade for many years and have been employed in the various technology fields (see J. Imrédy "Analytical Applications of Ion Exchangers", Pergamon Press 1966, Chapter 10 Sections 4 and 5). A limitation to their use is set up by the poor resistance if an organic matrix to the various chemico-physical agents such as temperature, ionizing radiation, oxidizing agents etc. On the other side it is well known that the inorganic substances are more resistant than the organic towards said agents and these same applicants have disclosed in a preceding U.S. Pat. No. 3,551,287 a method for preparing totally inorganic papers and membranes for ion exchange which are made of cerium(IV) phosphate and which are more resistant than the organic ones to the above mentioned agents.

Papers made of cerium(IV) phosphate have been successfully used in chromatographic separation processes (see G. Alberti, M. A. Massucci & E. Torracca, Journ. of Chromatography, 30, 579 (1967)) and totally inorganic homogeneous membranes have been prepared and classified with respect to their chemicophysical and electrochemical properties (see Pittelis, Tesi sperimentale di laurea - Istituto di chimica Generale ed Inorganica, AA 1968-1969 - Università di Roma).

It is therefore an object of this invention to provide a method for preparing inorganic papers and membranes which are made of thorium acid phosphate such that the present field of application of totally inorganic papers and membranes for ion exchange can be definitely extended thereby.

Other objects and advantages of the inorganic papers and membranes of this invention will become evident from the following description thereof.

In a copending patent application by the same applicants (see U.S. Pat. application Ser. No. 163,090 filed July 13, 1971 now abandoned) a process is disclosed for preparing fibrous thorium acid phosphate. Such material is a cation exchanger and possesses a fibrous structure adapted for preparing an inorganic "paper for ion exchange" which term is used herein to signify a product of which the appearance is like usual cellulose paper, which product is obtained from fibrous material and possesses ion exchange properties.

A typical process for obtaining the above mentioned paper from fibrous thorium acid phosphate according to this invention comprises the following steps:
- thorium acid phosphate is prepared according to the process disclosed in the above mentioned patent application;
- after precipitating; digesting and washing the fibrous thorium phosphate, a suspension in water or in a slightly acid solution — such a diluted phosphoric acid solution — is made with a suitable amount of said material, which amount depends on the thickness and surface of the paper sheet to be obtained;
- the above solution is slowly filtered on a flat filter, e.g. a paper or porous plastic filter suitably supported; when a high consistency of the paper is to be achieved the filtering may be carried out under pressure, under vacuum on in a centrifuge.

With the above process both very thick layers and thin layers less than 1 millimeter thick can be obtained the thickness depending on the amount of the process material.

The above example is given as an illustrative non-limiting example in as much as said layers can be obtained also by any of the usual techniques for preparing cellulosic papers such as calendering, pressing vibration, filtering and the like.

The papers obtained by one of the above described processes have a certain degree of porosity and for this reason they can absorb liquids (aqueous solutions or not) due to capillarity. Such a feature makes these papers usable in ascending or descending chromatography and in zonal electrophoresis.

The ion exchange properties of the fibrous thorium acid phosphate which is utilized for preparing such papers makes them also suitable for use in various processes for chromatographic separation through ion exchange.

To the purpose of rendering the papers of this invention adaptable to meet the different requirements of chromatography and electrophoresis, the capillarity properties of the same papers may be modified by adding to thorium acid phosphate a suitable additive, for instance a paste of chromatographic paper whereby a mixed paper is obtained of thorium acid phosphate plus additive.

With respect to the papers which consist of cerium-(IV) phosphate, those made of thorium acid phosphate possess a greater stability towards the reducing agents. This property becomes very important when these papers are employed in chromatography, in as much as reducing agents are used as eluents or developers in the chromatographic techniques.

Furthermore, while cerium(IV) decomposes at temperatures above 500° C due to the cerium reduction from Ce(IV) into Ce(III) this is not the case with the fibrous thorium acid phosphate which consequently shows a greater resistance to thermal treatments. On the other side the thorium acid phosphate papers are redioactive and have a lesser flexibilty than the cerium-(IV) phosphate papers.

With the fibrous thorium acid phosphate, inorganic membranes for cation exchange can also be prepared which therefore are an object of this invention. The term cation exchange membrane is used therein to signify any material with cation exchange properties which, independently of its geometrical form, can be employed as a partition between two solutions and which shows a greater permeability for cations than for anions.

Many chamico-physical characteristics of a membrane for ion exchange such as the membrane potential, the permselectivity etc. are remarkably improved by lowering the membrane porosity. For obtaining a cation membrane of low porosity from thorium acid phosphate, several processes can be employed such as:
a. obtaining thick layers through filtration as indicated above and subsequently reducing the layer thickness through calendering or pressing;
b. successive filtration of small portions of a finely dispersed precipitate until solid layers are obtained which do not allow liquids to pass through even under vacuum;

c. adding particular water repellent additives such as plastic substances to the thorium phosphate suspension prior to filtrating or to the thorium phosphate paper after filtration. The purpose of such additives is for reducing the product porosity.

In these cases heterogeneous membranes will be obtained made of thorium acid phosphate plus additive.

What is claimed is:
1. Inorganic papers for ion exchange, wherein the basic texture of the paper is fibrous thorium acid phosphate with a molar ratio $PO_4/Th$ in the solid ranging from 1.9 to 2.1.
2. Inorganic membranes for ion exchange, wherein the basic structure of the membrane comprises fibrous thorium acid phosphate with a molar ratio $PO_4/Th$ in the solid ranging from 1.9 to 2.1.

* * * * *